US008020282B2

(12) United States Patent
Sadiku et al.

(10) Patent No.: US 8,020,282 B2
(45) Date of Patent: Sep. 20, 2011

(54) APPARATUS FOR PRODUCING A COIL WINDING FOR STATORS OR ROTORS OF ELECTRICAL MACHINES

(75) Inventors: Sadik Sadiku, Neuberg (DE); Keith A. Witwer, Fort Wayne, IN (US)

(73) Assignee: Elmotec Statomat Vertriebs GmbH, Karben (DE)

( * ) Notice: Subject to any disclaimer, the term of this patent is extended or adjusted under 35 U.S.C. 154(b) by 0 days.

(21) Appl. No.: 12/750,830

(22) Filed: Mar. 31, 2010

(65) Prior Publication Data

US 2010/0180433 A1    Jul. 22, 2010

Related U.S. Application Data

(62) Division of application No. 11/184,983, filed on Jul. 20, 2005, now Pat. No. 7,703,192.

(30) Foreign Application Priority Data

Jul. 20, 2004   (DE) .................. 10 2004 035 084

(51) Int. Cl.
  *B23P 19/00*   (2006.01)
  *H02K 15/00*   (2006.01)
(52) U.S. Cl. ............... 29/732; 29/735; 29/736

(58) Field of Classification Search .............. 29/732, 29/596, 598, 606, 735, 736; 310/180, 206, 310/207, 216.001, 606
See application file for complete search history.

(56) References Cited

U.S. PATENT DOCUMENTS

| 3,621,311 A * | 11/1971 | Von Starck et al. ............. 310/13 |
| 6,337,529 B1 * | 1/2002 | Higashino et al. ..... 310/216.008 |
| 6,777,850 B2 * | 8/2004 | Harada et al. .............. 310/254.1 |
| 7,281,312 B2 * | 10/2007 | Sadiku et al. ................... 29/596 |

* cited by examiner

*Primary Examiner* — Thiem Phan
(74) *Attorney, Agent, or Firm* — Stites & Harbison PLLC; Douglas E. Jackson

(57) ABSTRACT

An apparatus for producing a coil winding for stators is described, in which each coil turn rests, with one fillet (14) each, in two stator slots, and the two fillets (14) are joined by a head portion (16). A plurality of coil turns are made simultaneously by winding up n parallel wires (10) with intermediate spacing onto a rotatable former (20). To obtain small winding heads, alternatingly in a work step A, one fillet (14) and the wire length of one head portion (16) are made from each of the n parallel wires (10) on the former (20). Then in a work step B, the resultant fillets (14) together with the adjoining first end of the respective associated head portions (16), and the wire guide together with the second end of these head portions (16), are displaced relative to one another along the former (20) by n times the intermediate spacing of the wires (10).

12 Claims, 10 Drawing Sheets

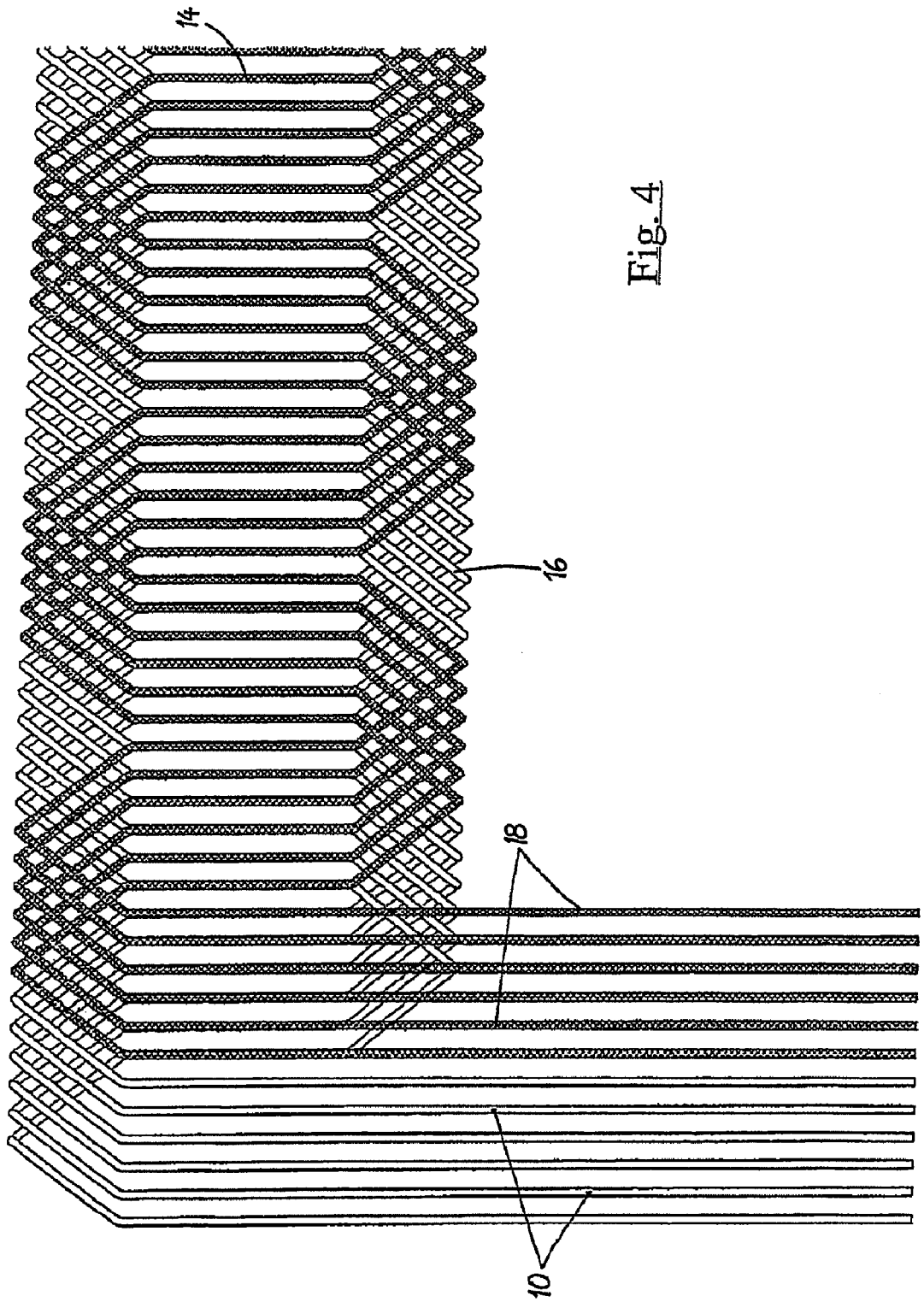

APPARATUS FOR PRODUCING A COIL WINDING FOR STATORS OR ROTORS OF ELECTRICAL MACHINES

CROSS REFERENCE TO RELATED APPLICATIONS

This application is a divisional of application Ser. No. 11/184,983, filed Jul. 20, 2005 now U.S. Pat. No. 7,703,192 (which is hereby incorporated by reference).

FIELD OF THE INVENTION

The invention relates to a method for producing a coil winding for stators or rotors of electrical machines, in which each coil turn rests, with one fillet each, in two stator or rotor slots, and the two fillets are joined by a head portion protruding past an end face of the stator, and a plurality of coil turns are simultaneously generated by winding up n parallel wires, paid out by a wire guide, with intermediate spacing onto a former, or template, that is rotatable about its longitudinal axis. This is normally the process for producing a concentric winding, in which, with each revolution of the former, only one coil turn is produced from each wire, with two fillets that are to be introduced in the further course of production into two stator slots. In contrast to a concentric winding, in the production of a wave winding, with each revolution of a former, from each wire, many fillets are shaped that are then to be introduced into many slots.

BACKGROUND OF THE INVENTION

Regardless of whether the concentric windings are in the stator in the form of concentric coil turns or coils or the concentric windings are arranged overlapping on the circumference, prior concentric windings are formed by winding up onto a former have the disadvantage that in the finished stator or rotor, the winding heads (composed of adjacent head portions) are relatively voluminous and in particular have a relatively great thickness in the radial direction. It is therefore the object of the invention to make a method and an apparatus available with which, especially when using round wire, a winding can be made that, regardless of how it is introduced into a rotor or stator, for a defined number of wire cross sections in the cross section of a stator or rotor slot, a radially narrow arrangement of the winding heads is obtained.

BRIEF SUMMARY OF THE INVENTION

The above object is attained as proposed by the invention, in terms of the method, in that for a stator or a rotor having a number of stator or rotor slots that is divisible by 2n and is to be occupied by the coil winding, in alternation in a work step A, one fillet and the wire length of one head portion are made from each of the parallel wires on the former, with a predetermined intermediate spacing of the fillets corresponding to the circumferential spacing of the stator or rotor slots, and in a work step B on the one hand the fillets formed in work step A, while maintaining their intermediate spacing, together with the adjoining first end of the respective associated head portions and on the other hand the wire guide together with the second end of these head portions are displaced relative to one another by n times the predetermined intermediate spacing in a first direction axially along the revolution axis of the former, until, after multiple repetitions of work steps A and B, the fillets for the last n stator or rotor slots are made on the former, thereafter the winding is removed from the former and pressed flat, so that the fillets are located in one row side by side, and then the fillets are placed preferably in unilaterally disposed transverse slots of a striplike coil holder and from there transferred into slots of a rotor or rotorlike transfer tool that are open radially outward and that have the same intermediate spacing measured on the circumference as the transverse slots, and from there are then positively displaced radially outward into the radially inward open stator or rotor slots brought radially into alignment with them. The winding, made by winding onto a former and pressed flat, could be further processed in some other way, however, for instance being placed in a toothed-rack-shaped stator lamination packet that is then bent into a round stator or used for a linear motor. The flat-pressed winding could also be placed directly into the slots of a rotor or into the slots of a stator of an external-rotor motor.

The proposed method is especially effective if, by means of shaping bodies mounted on the former, the head portions are shaped essentially in a V or gable shape, with a rounded apex protruding axially outward from the stator or rotor. The intersecting points of the wires in the winding heads are then located on a cylindrical plane with relatively great intermediate spacing side by side instead of radially one above the other. It also has a positive effect if the head portions, by means of the axial displacement of their first end relative to the second end during work step B, are shaped in such a way that after the introduction into the stator or rotor, one of their legs is located partly radially farther outward than the other leg.

The radial compression, relative to the revolution axis of the former, of the coil windings previously made helically with graduations on the former, is promoted if the fillets on opposite sides of the former are made in two parallel, straight planes spaced apart by less than 1 cm. It is a special feature of the proposed method that by means of the aforementioned work step B and then the compression of what in principle is a helically wound concentric winding, a particular type of wave winding is created, in which the fillets change over on one end into a head portion located radially farther outward, while their other end is adjoined by a head portion located radially farther inward. The group of n parallel wires, even if the wires in the stator slots form only a single layer of wire, for instance located radially all the way to the outside, in this way are entangled with one another in the region of the head portions, so that overall, the winding forms a structure that holds together in the manner of a net.

Preferably, by the novel method, a so-called distributed winding is made, in that after the first winding, a second winding with an equal number of fillets is made from n parallel wires and introduced, together with or after the first winding, into the stator or rotor slots by means of the coil holder and transfer tool in such an arrangement that the head portions adjoining one fillet on both sides of the stator or rotor, in each case are bent at an angle in the opposite circumferential direction from the fillet relative to the head portions adjoining the fillet belonging to the first winding and located in the same stator or rotor slot, and the ends of the two windings are electrically polarized such that the current flows in the same direction through the fillets located in the same stator or rotor slot.

This kind of distributed winding in narrow stator slots in which all the wires are located in a single radial row occupies only two wire layers, for instance. It will be observed that despite the large number of wire intersections in the region of the winding heads, there too only a radial wire arrangement with the thickness of two wire layers exists because of the uniformly distributed wire intersections.

A distributed winding, which is to be preferred for the above reasons, can be made in three different ways. In the first variant embodiment, one end of the wires of the first half of the distributed winding is joined to one end of the wires of the second half of the distributed wave winding, in such a way that the current flows through the fillets located in one stator slot in the same direction. In the second variant embodiment, a winding extending twice, four times, or an even number of multiple times about the stator circumference, in the flat-pressed state is folded over onto itself in the middle; care must be taken to assure that on the two axial ends, the winding heads of one half of the winding are located in the respective gaps between the winding heads of the other half of the winding.

The third variant embodiment, finally, provides that the first half of the distributed winding is made with a defined first winding direction and in a first axial direction progressively on the former, and then continues to be wound onward without interruption, with opposite winding direction in the opposite axial direction.

If for the sake of better flexibility, for instance, instead of a coil wire of large cross section, two coil wires of smaller cross section are to be used, then instead of n parallel wires, work can be done with n pairs of wires.

The apparatus intended for performing the above-described method has a former that is rotatable in controlled fashion about its longitudinal axis and has a wire guide for paying out n parallel wires, which can be wound up simultaneously onto the former with a predetermined axial intermediate spacing; each coil turn can be shaped into two substantially straight fillets, to be introduced into the stator or rotor slots, and into head portions that adjoin the ends of these fillets.

According to the invention, the former essentially has the shape of a flat strip or rail, whose width is equivalent to the length of the fillets, and movable shaping bodies for making the head portions and guide devices for retaining and guiding the resultant fillets relative to the wire guide cooperate with the former such that each time after a one-half rotation of the former for forming one fillet and one head portion from each of the n parallel wires, and after a deflection motion of a shaping body, which motion relieves the head portions, a relative motion that spreads the head portions can be executed between the wire guide and the guide devices in a first axial direction parallel to the pivot axis of the former. The most recently made fillets and the wire guide move apart by n times the predetermined intermediate spacing of the parallel wires. A striplike or rail-like coil holder with unilaterally disposed transverse slots for receiving the fillets of the winding stripped from the former as well as a rotor or rotorlike transfer tool with slots that open radially outward are furthermore present, which for transferring the winding first are brought into alignment individually and in succession with the transverse slots of the coil holder and then jointly with the stator or rotor slots.

With the novel production method, the invention simultaneously makes a novel stator or rotor available that has stator or rotor slots that are open radially inward, in which slots the fillets of a wave winding formed of n wires or pairs of wires are located, the n wires or wire pairs of which upon each pass through the stator or rotor lamination packet are each located in n successive slots in the circumferential direction and intersect, in the region of their substantially gable-shaped head portions, each at intersecting points located with an intermediate spacing, such that with reference to a defined circumferential direction, of the n successive wires, the next wire in the circumferential direction in each case extends radially outward on one end of the stator and radially inward on the other end of the stator past the wire located before it in the circumferential direction, and the two head portions adjoining one wire fillet are each located before the fillet on one end of the stator, and behind the fillet in the circumferential direction on the other end of the stator. The winding is preferably embodied as a distributed winding, both halves of which are joined together preferably without a wire interruption. The slots of the stator or rotor preferably have an asymmetrical shape in cross section, which is adapted to two rows of wires that are located side by side as close together as possible and staggered so as to fill gaps.

BRIEF DESCRIPTION OF THE DRAWINGS

Several exemplary embodiments of the invention will be described in further detail below in conjunction with the drawings. Shown are:

FIG. 4, a top view on the left-hand end of the superimposed windings of FIG. 3, on a larger scale;

FIGS. 8A through E, front views of the winding apparatus of FIG. 7, in various phases of a winding operation;

DETAILED DESCRIPTION OF THE INVENTION

Figure 1:
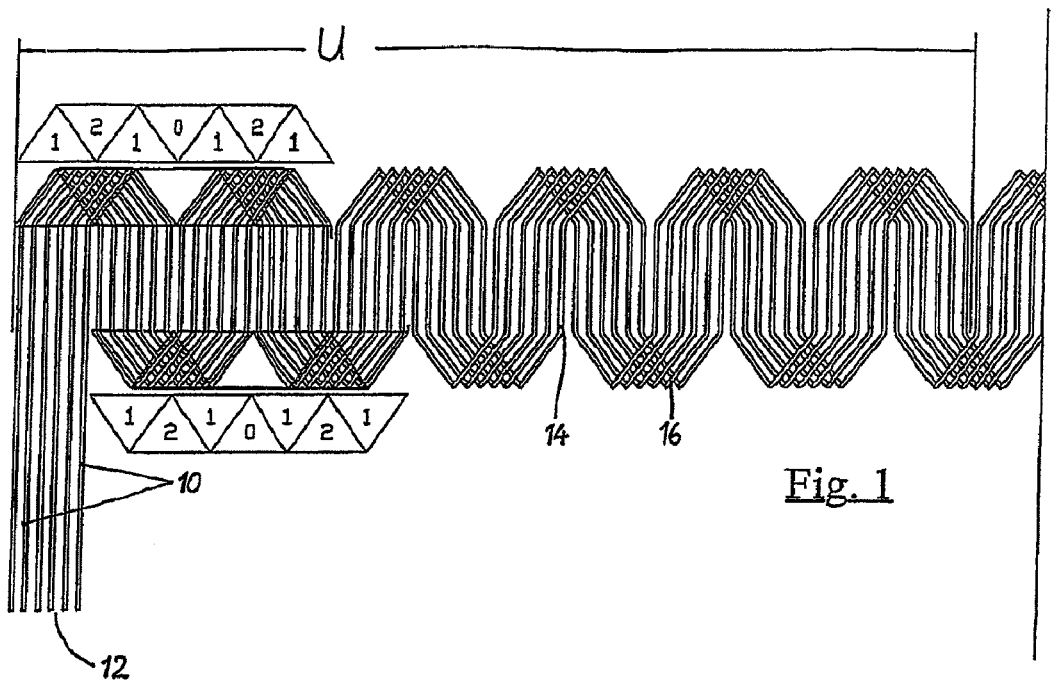
FIG. 1, a schematic illustration of a stator winding, spread flat apart, made on a rotatable former.

FIG. 1 shows a winding made from six parallel wires 10 by the method described below, in this example for a stator with 72 slots, which are open radially inward and are distributed uniformly on the circumference. The winding in FIG. 1 has been wound onto a striplike flat former and is then shown in the compressed state, spread flatly apart. The beginning of the winding is indicated at 12. Because of the winding up onto the striplike former, from the six wires 10, in the first portion U shown of winding 72, initially straight wire portions, here called fillets 14, that are located parallel side by side with equal intermediate spacing have been shaped, which in a later method step are thrust into the 72 slots in the stator. Each fillet 14 merges, on its upper and lower ends, into a gable-shaped head portion 16, to the right on one side and to the left on the other, in each case bent on both ends of a fillet to opposite sides.

The wires 10 intersect at the gable-shaped head portions 16. It can be seen that all the intersecting points are offset from one another in height and width. FIG. 1 also shows which part of a head portion 16 is located above or below one or more head portions of the other wires 10. It can therefore also be seen from FIG. 1 that, viewing from right to left, the six wires 10 have been wound clockwise, parallel and side by side, helically around the striplike former; only in the region of the head portions 16 are the resultant helical coils slanted.

Viewed over their length, the head portions 16 do not have the same pattern of uniform distribution as the fillets 14. As shown in FIG. 1, the head portions 16 form a repeating succession of four triangular portions, in which the wires 10 are initially in a single layer, then in the intersecting region in two layers, and then again in a single layer, which is adjoined by a free triangular region, before the pattern repeats. In the region of the intersecting points, there is only a two-layer arrangement of the wires, because all the intersecting points are located at different places.

If the six parallel wires 10 are considered as a group, then it can be seen from FIG. 1 that this group, like every individual wire 10, in the compressed, flatly spread-apart state, forms the pattern of a wave winding, with the special feature that in the order of the head portions 16, alternatingly above and below, the wire 10 located farthest to the right crosses over the other wires first, and the next time the wire 10 located farthest to the left does so. In general, it is true that if one pass of the group of six wires 10 through the stator lamination packet is considered, in the head portions adjoining the one end of the fillets 14, from left to right in terms of FIG. 1, each head portion 16 crosses radially outwardly over the preceding one, while on the other end of the fillets 14 the situation is vice versa.

Figure 2:
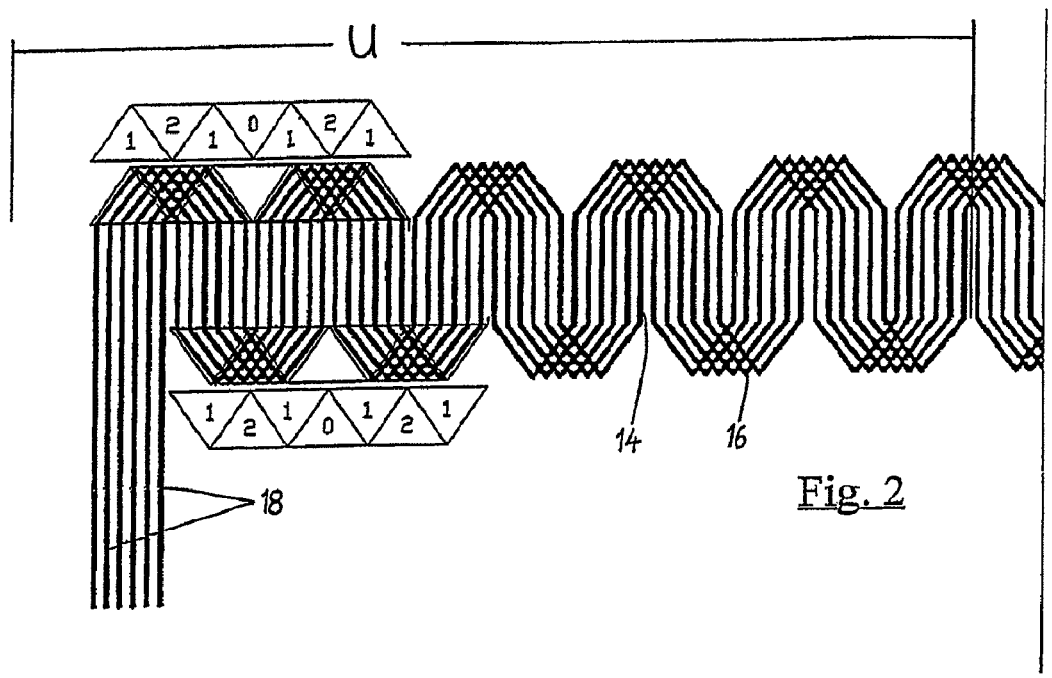
FIG. 2, the same kind of stator winding, which together with the winding of FIG. 1, but offset along the circumference of the stator, can form a distributed winding.
Figure 3:
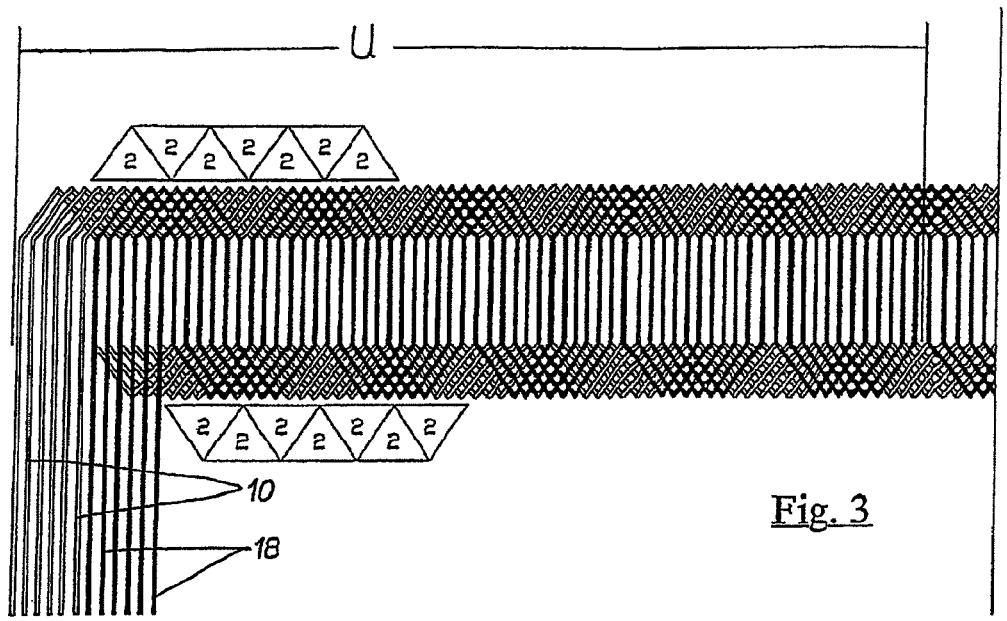
FIG. 3, a top view on the superimposed windings of FIGS. 1 and 2.

FIG. 1 shows only the first half of the entire winding, which extends twice around the circumference of the stator. FIG. 2 shows a winding of the same kind, made independently of the first winding from a further six wires, in its first half. Overall, this winding likewise extends twice around the circumference of the stator. The two windings, shown one above the other in FIG. 2, namely offset by six slots on their circumference, are also introduced in that condition successively into the slots of the same stator. FIG. 3 shows the two windings of FIGS. 1 and 2 in the flatly spread-apart state; for the sake of distinguishing them, the six wires of the winding of FIG. 2, which are marked 18, are shown in black. It can be seen that now in the region of the head portions 16, there is a two-layer wire construction throughout all triangular segments. In other words, this means that the wire intersections are distributed very uniformly, or in other words optimally, over the entire circumference of the stator. The two-layered wire construction in the region of the head portions 16 agrees with the number of wires in each slot. If the stator slots are so narrow that the wires are located in them in only one radially row, then the number of wire layers in the slots is equal to the number of wire layers in the region of the end windings. However, an embodiment of the stator in which the slots are so wide that the wires are located in them in two radial rows, tightly packed, is preferred.

Figure 5:
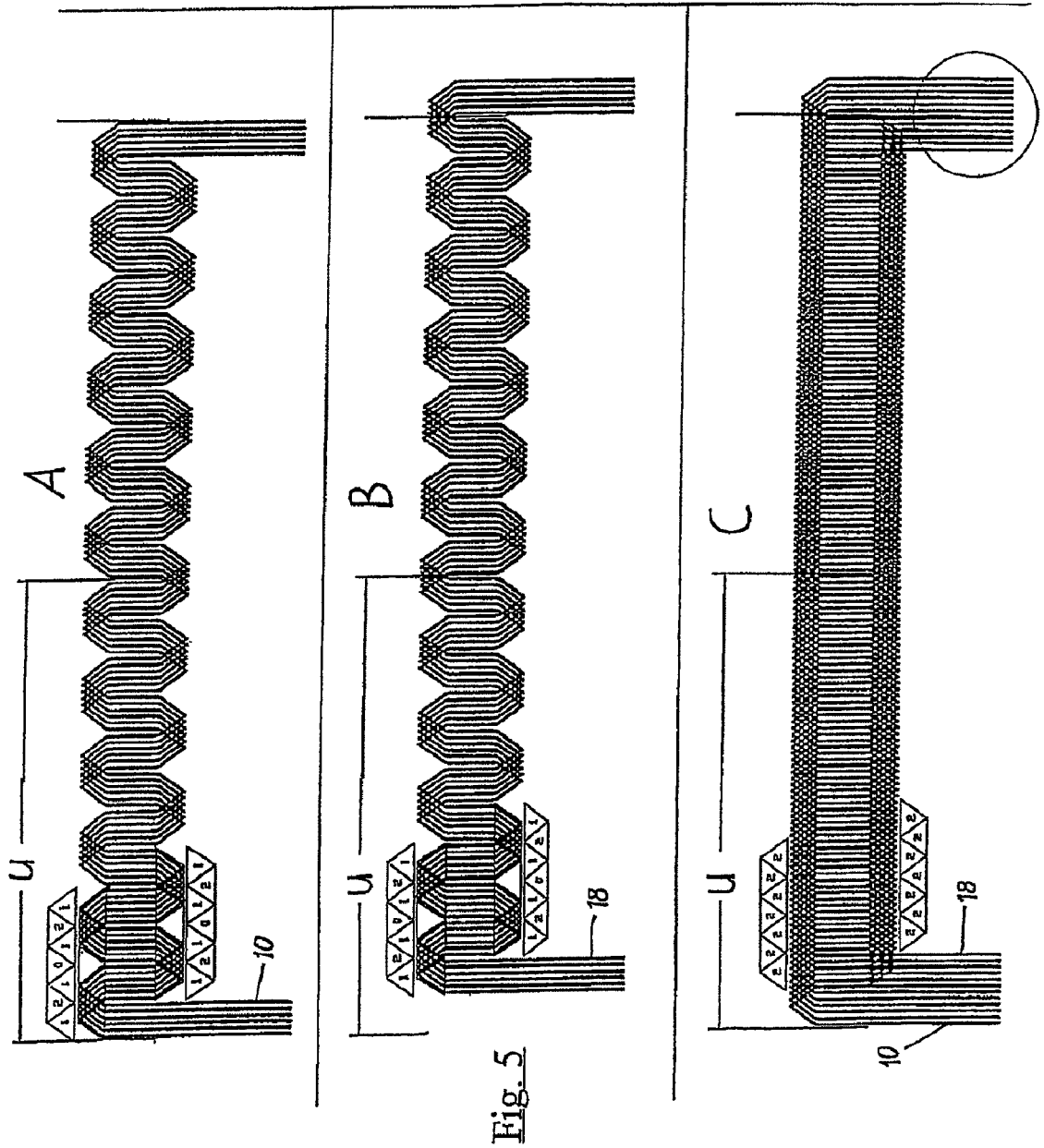
FIGS. 5A through C, full views of the windings only half of which are shown in FIGS. 1 through 3.

The uniform distribution of the end windings 16 can be seen especially well in FIG. 4, which shows an enlargement of the beginning of the winding of FIG. 3. FIGS. 5A, B, C show the windings of FIGS. 1, 2 and 3, each in their full length. The possibility exists of joining the total of twelve wire ends together on the right-hand end of the assembled winding of FIG. 5C, in such a way that in both wires located in one stator slot, the current flows in the same direction. Since furthermore the two wires located in one slot form two end windings on each end that are bent to opposite sides, the result is what is called a distributed winding. Moreover, taking its creation on a rotatable former into account, this winding is a loop winding, with the special feature that its coil turns (loops) are pulled axially apart and overall deformed by flat pressing into a wave winding.

In view of the fact that the coil turns are partly displaced axially past one another on the former, the windings of FIGS. 1 through 5 could also be called lap windings.

Figure 6:
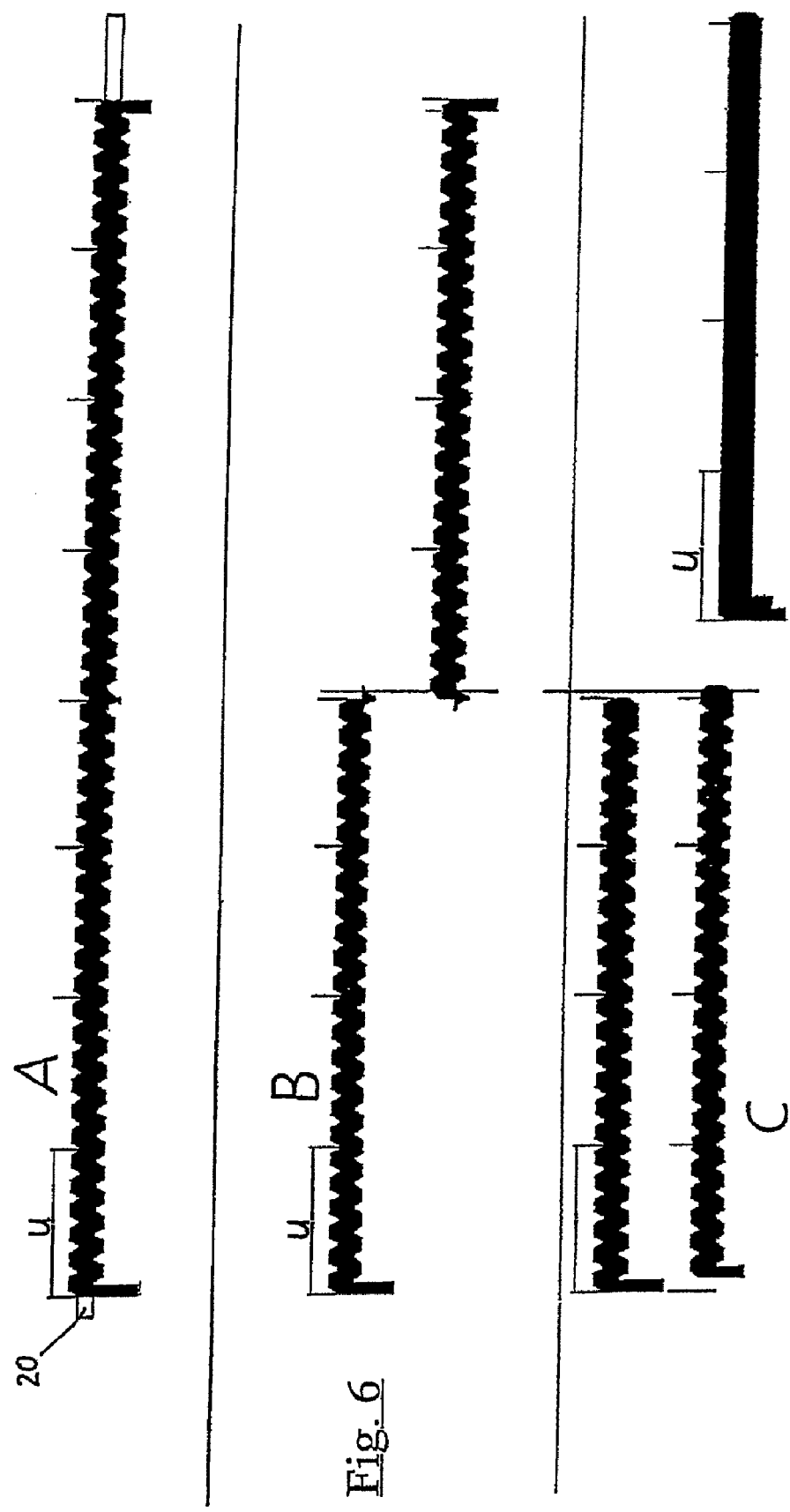
FIGS. 6A through C, a schematic illustration of a method for making a distributed winding by folding.

The winding shown in FIG. 6A corresponds to that in FIG. 1 or 2 as well as 5A or 5B, but is so long that it extends eight times around the circumference of the stator lamination packet into which it is to be introduced. FIGS. 6B and C now show a further possibility for making a distributed winding from the single-layer winding of FIG. 6A. For that purpose, the winding of FIG. 6A is folded over onto itself next to its center and placed flatly onto one another with the offset of the two winding halves as shown in FIG. 6C; unlike what is shown in FIGS. 6B and C, the wires of the long winding of FIG. 6A are not severed on being folded over. With the offset shown in FIG. 6C, the two winding halves, placed over one another without a wire interruption, also produce a distributed winding, of the kind described in conjunction with FIG. 5C. This joined-together winding is shown on the right-hand side of FIG. 6C. Since its length now extends four times around the stator circumference, and because of the folding the winding is in two layers, a total of eight fillets 14 are now to be introduced into each stator slot. It is understood that the type of winding described above is not limited to a specific number of parallel wires. More or fewer than the six parallel wires shown could also be used. Even the number of stator slots does not matter, in the context that occurs in practice. On the contrary, because in the proposed winding the winding heads occupy an optimally small space, the novel winding is also suitable for applications for which other, conventional windings cannot be considered.

In FIGS. 7, 8A through E and 9, a simple winding apparatus for creating the windings of FIGS. 1 through 6 is shown. An essential part of the winding apparatus is a narrow, striplike former 20, which together with a disk 22 that supports it is rotatably supported in a housing 24. The former 20 has a thickness of only a few millimeters, typically less than 1 cm, and in the upright position shown in FIG. 8A, it has a height equivalent to the length of the fillets 14 to be made. In the exemplary embodiment shown, the striplike former 20 can be advanced through the disk 22 and the housing 24 in the longitudinal direction in increments to the right, in terms of FIG. 7. In the disk 22, two bolts 26 and 28 are also supported with radial intermediate spacing from the short sides of the former 20; these bolts can be advanced axially outward in phases and retracted in phases into the disk 22. They form shaping bodies for the head portions 16 of the windings to be produced.

The apparatus shown furthermore has a wire guide, identified overall by reference numeral 30. It is composed of two lower, pivotably connected guide parts 32, 34 and one upper guide part 36, which can be called a comb. The guide part 34 is pivotable relative to the guide part 32 by means of a power cylinder 38, and the comb 36 is pivotable relative to the guide part 34 by means of a power cylinder 40.

The wires, for instance six of them, supplied to the wire guide 32, 34, 36 pass first through a wire clamp 42, which in the closed state prevents more wire from being pulled toward the former 20.

Figure 9:
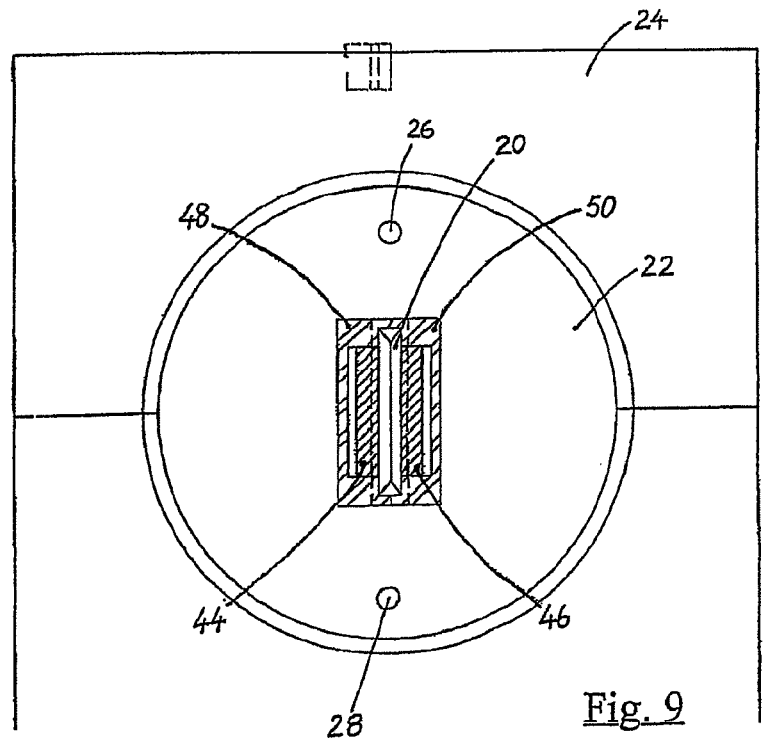
FIG. 9, a side view on a larger scale of the winding former that forms part of the winding apparatus of FIGS. 7 and 8A through E.

Finally, the winding apparatus of FIG. 9 also includes four guide and braking shoes, namely one inner shoe 44 and one outer shoe 48 on one side and one inner shoe 46 and one outer shoe 50 on the other side of the former 20. The shoes are movable individually and jointly along the striplike former 20 and moreover can be pressed in a controlled fashion against the former 20 and the wires contacting it, or selectively lifted from the former 20. Guide grooves shown in dashed lines in FIG. 9 in the contact-pressure faces of all the shoes 44 through 50 each receive one fillet of the winding to be made on the former 20, and the many parallel guide grooves assure that the fillets made on the former will maintain their predetermined intermediate spacing. The guide and brake shoes on each side of the former cooperate in the manner of intermittent conveyors. For instance, while the inner shoe 46 retains and guides the fillets, already made before, of a winding in the intended position relative to one another, the outer shoe 50 can lift from the former 20, move along the former 20 to the disk 22, and by renewed contact pressure against the former, it can grasp the six fillets just made previously on the former. Simultaneously, however, the outer shoe 50 also again grasps the fillets that were formed beforehand. The inner shoe 46 can therefore then lift from the former 20, also move along the former 20, and then by contact pressure against it grasp the fillets again and retain them. Thus the wire windings already formed are retained and guided uninterruptedly, even if the guide and brake shoes 46, 50 on one side or 44, 48 on the other of the former have to be shifted individually onward in the longitudinal direction after the further formation of fillets 14.

Figures 7, 8:
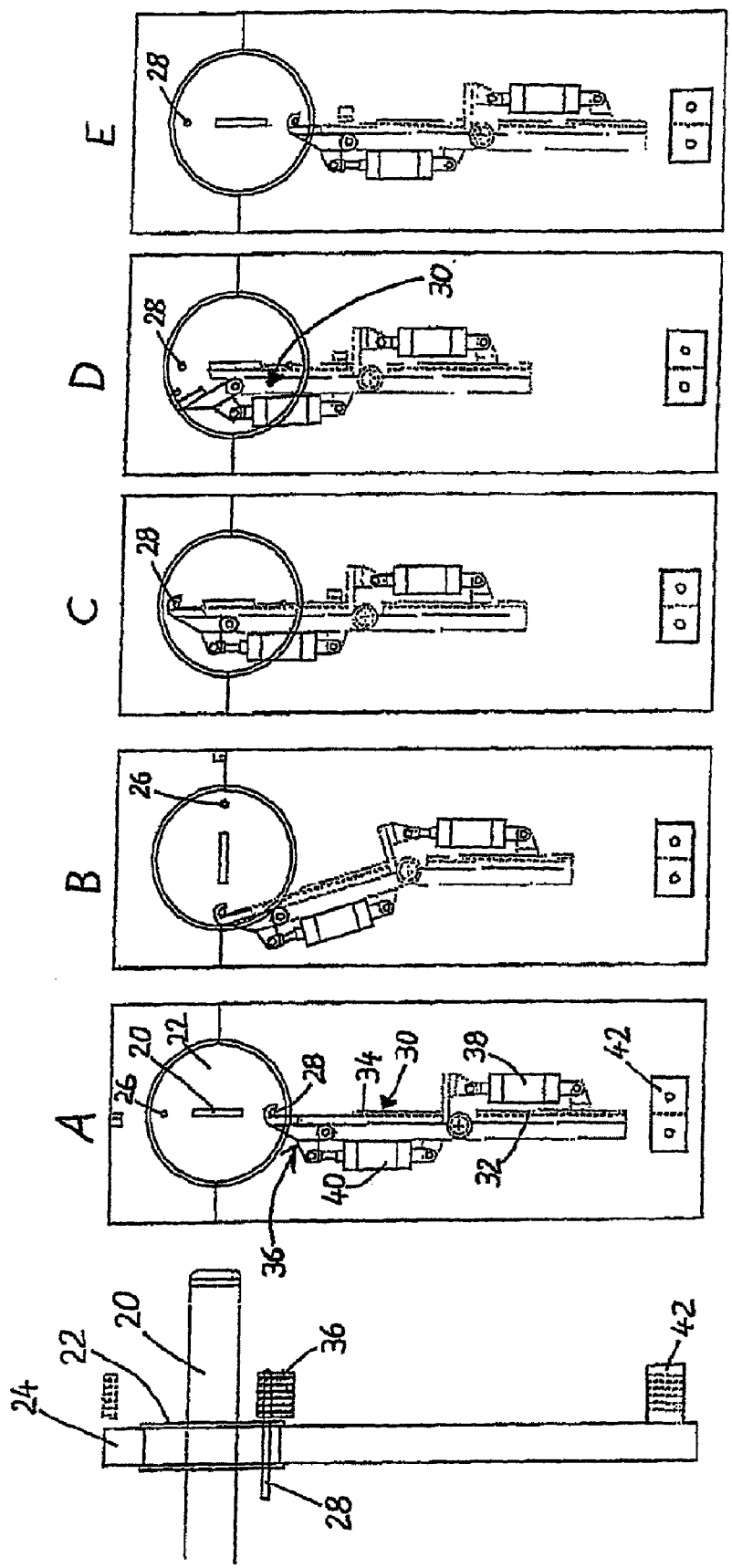
FIG. 7, a simplified side view of a former and a wire guide for making windings of the type shown in FIGS. 1 through 6.
Figure 10A:
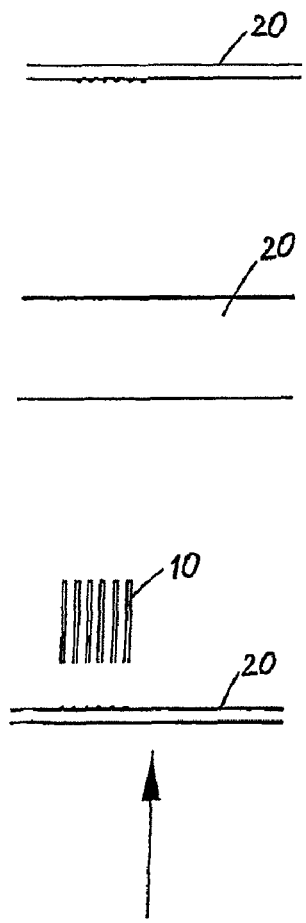
FIGS. 10A through I, a simplified illustration of various phases in the creation of a winding of FIGS. 1 through 4 on a winding apparatus of FIGS. 7 and 8A through E.
Figure 10B:
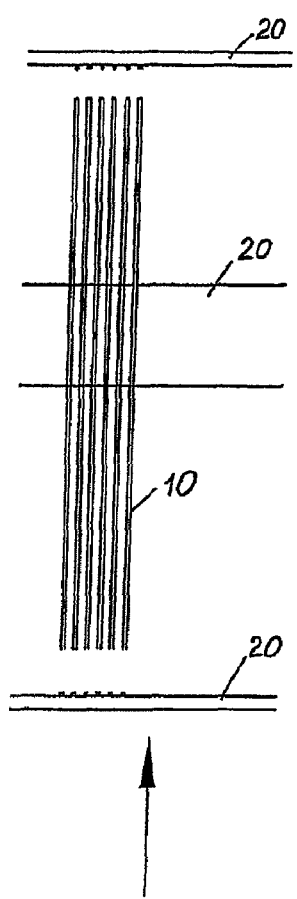
Figure 10C:
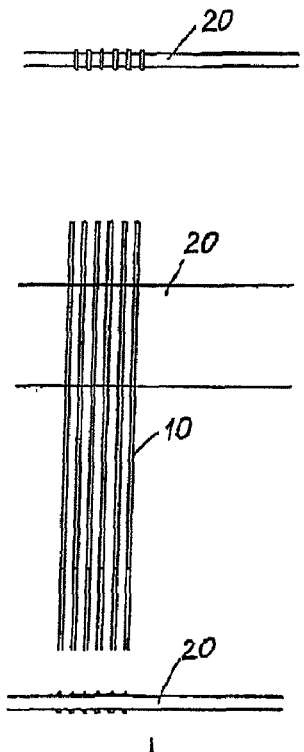

The shaping of a winding by means of the apparatus of FIGS. 7 through 9 can be described as follows, in conjunction with the schematic illustrations in FIGS. 10A through I:

The six front wire ends, shown as an example, are advanced, arriving from below, by the wire guides 32 and 34 in FIG. 10A to the former 20, which is shown in each of the views in FIG. 10 in a side view in the middle, in a top view at the top, and in a view from below at the bottom. In the position in FIG. 10B, the six wires 10 have been advanced upward, past the former 20. The projecting part of the wires 10 protruding past the former 20 later forms the beginning 12 of the winding. In this position, the front wire ends are bent, for instance downward around the bolt 26, until they contact the back side of the former 20 and are fixed there, resulting in the situation shown in FIG. 10C. The bolt 26 is not shown, however.

While in the initial phase the former 20 still maintains its outset position shown in FIG. 8A, the outer guide and brake shoe 50, for instance, grasps the wire ends contacting the back side of the former 20, and the former 20 is then, along with the shoe 50, displaced to the right in terms of FIG. 10 by six times the intermediate spacing between the wires 10, while the wire guide 32 through 36 restrains the strands of wire coming from the wire supply against axial displacement relative to the pivot axis of the former 20, and the wire clamping device 42 prevents the wires from being pulled onward toward the former 20. Immediately before this axial relative displacement of the beginning of the winding relative to the wire guide 30, however, the bolt 26 has been retracted into the disk 22, so that the first head portions 16 are made in gable-shaped form as shown in FIG. 10B and can accordingly yield in height in accordance with the width of their spreading. FIG. 10D is a very good illustration of the fact that the wires, in the spreading of the head portions 16, become somewhat twisted at their upper tips. Because of the thickness, although slight, of the former 20, the wires place themselves cleanly one above the other in two planes at the intersecting points.

In the next step, the comb 36 of the wire guide 30 catches on the guide bolt 28, located at the bottom in terms of FIG. 8A, and follows that bolt in its motion during a one-half revolution of the disk 22 with the former 20. This motion is represented in the drawing by the transition from the position of FIG. 8A to the position of FIG. 8B and onward until the position of FIG. 8C. Since in the half revolution of the former, its front side, located to the left in FIG. 8A, becomes the back side, the six strands of wire contacting its front side now contact its back side, and from there, the wires extend past the guide bolt, now located at the top in FIG. 8C, to the wire guide 30, which after the intermediate release of the wire clamp 42 during the rotary motion of the former and the now renewed clamping can be retracted, in the same way as the guide bolt 28. For the winding that is to be made, the result is the state shown in FIG. 10E.

Figure 10D:
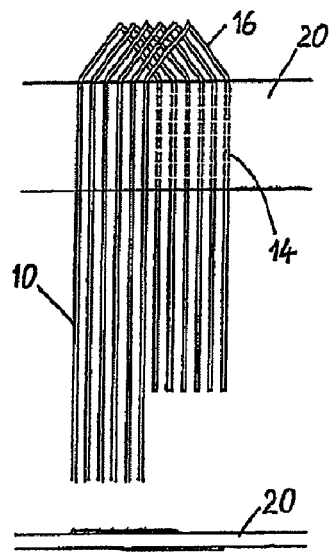
Figure 10E:
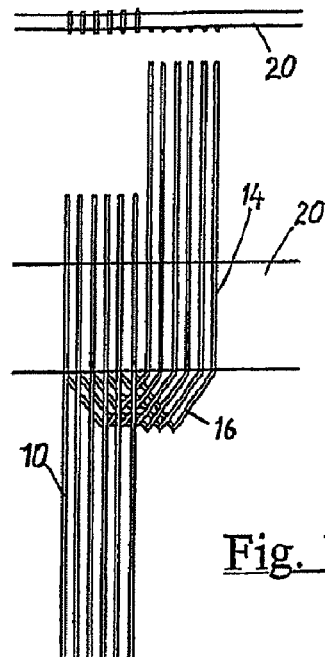
Figure 10F:
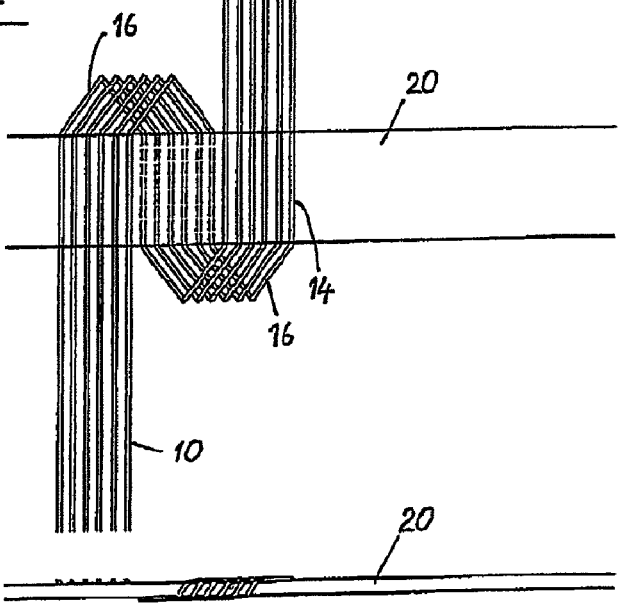
Figure 10G:
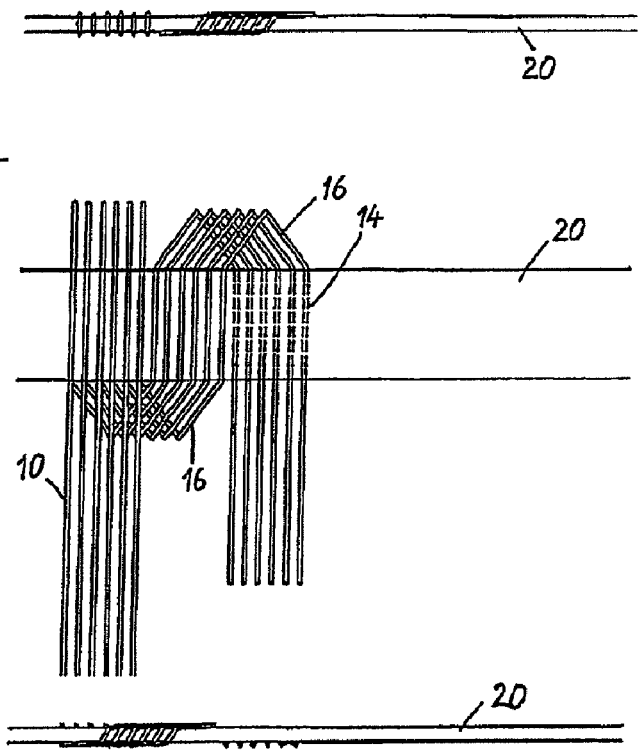
Figure 10H:
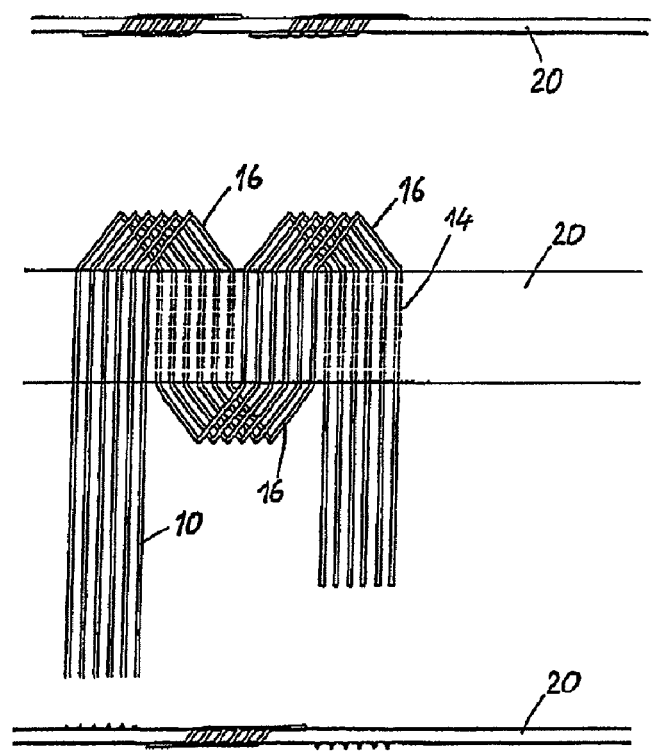
Figure 10I:
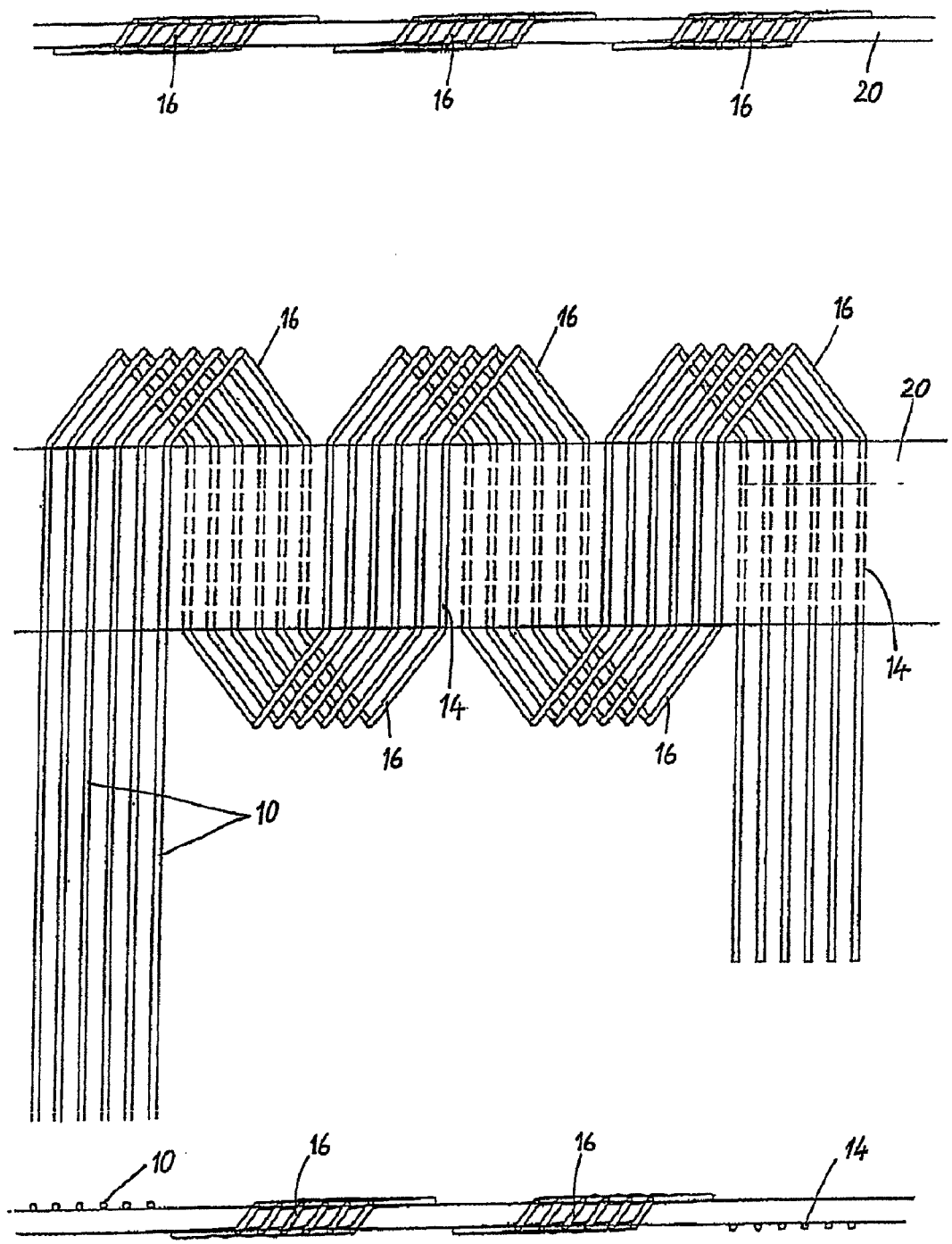

In the next work step, a guide and clamping shoe, for instance the shoe 48, located on the back side of the former 20 moves to the left in terms of FIG. 10E, so as to grasp the fillets 14 formed opposite the wire guide on the back side of the former 20. A new intermittent axial motion of the former 20 follows, together with all the shoes 44 through 50 that retain the fillets 14 thus formed, so that for the winding, the state shown in FIG. 10F is reached, now with two groups of head portions 16 spread into the shape of a gable.

Next, the comb 36 of the wire guide 30 is retracted downward, where it contacts the guide bolt 26 located there. With the wire clamp 42 released, the next half revolution of the disk 22 together with the former 20 and the guide and clamping shoes 44 through 50 contacting it follows, resulting in the state of the winding shown in FIG. 10G. After that, the above-described operation of grasping and displacing the last fillets 14, contacting the back side of the former, takes place once again, while the wire guide 30 axially restrains the arriving strands of wire, and the wire clamp 42 is again closed. The winding thus arrives at the state shown in FIG. 10H. Since the winding increments each repeat in the same way, in alternation with a half revolution of the former 20 and an axial relative displacement of the fillets 14 newly formed on the back side of the former 20, FIG. 10I now shows only a further intermediate state of the winding made, on a larger scale. In this way, the winding grows to the desired number of fillets, corresponding to the number of stator slots to be filled, or a multiple thereof.

A distributed winding can also be made, once a defined length of a single winding is reached, by continuing work as in FIGS. 10A through I with a reverse direction of rotation and a reversed intermittent displacement direction of the former 20.

Figure 11:
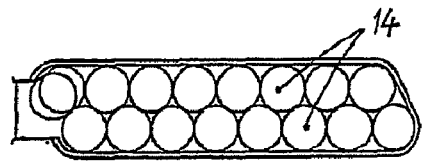
FIG. 11, a cross section through a stator slot that is filled with the wires of two distributed wave windings of FIG. 6.

Once a winding with the intended length has been made on the former and has been cut to length from the wire supply by means of a cutting device, not shown, it can be stripped axially off the former 20 along with the guide and clamping shoes 44 through 50. Then the winding is compressed, in the order of the fillets that is maintained by the guide and clamping shoes 44 through 50, so that all the fillets 14 are located in essentially one straight plane, and in this form is transferred to a likewise striplike coil holder with transverse slots at the spacing of the guide grooves in the shoes 44 through 50. Optionally, one of the shoes 44 through 50 may also already serve as a coil holder. If a plurality of windings are to be put in a defined arrangement relative to one another and introduced together into a stator, then they can first be collected in the coil holder and then, as shown for instance in FIGS. 8 and 9 of German Patent Application 103 28 956.9, transferred to slots, which are open radially outward, of a rotorlike transfer tool. As also described in the aforementioned patent application, the transfer tool is then inserted into the stator bore in such a way that the slots that contain the winding are radially aligned with the stator slots. In the last step, as shown in FIGS. 10 and 11 of German Patent Application 103 28 956.9, the fillets of the winding or windings are thrust radially out of the slots of the transfer tool into the stator slots.

Since in the proposed winding method, very small winding heads can be made, the smallest possible cross sections of stator slots are also sought. According to FIG. 11, the stator slots are meant to be designed such that, with the usual radial orientation between parallel side walls they have a width that amounts to (1+cos 30°) times the wire diameter. Precisely two rows of round wires fit into this slot, if they are offset optimally closely so as to fill gaps. In the exemplary embodiment of FIG. 11, corresponding to the location of the wires, the radially outer wall of the stator slot forms angles of 60° and 120°, respectively, with its side walls, and the corners are expediently rounded with half the wire diameter.

The slot entrance located radially inward needs to be only slightly larger than one wire diameter, since the wires can be introduced successively into the slot. The transitions from the side walls to the narrow entrance channel are rounded to correspond to the wire diameter, and since the side walls are of equal length, they are radially offset from one another, as shown in FIG. 11. The contour of the entrance region can be designed such that the last wire introduced into the slot still just barely finds its place, slightly around the corner, laterally offset from the slot entrance, blocks the other wires against a motion in the direction of the slot entrance and is itself restrained in the slot by the force exerted on it by the next-to-last wire in the diagonal direction in combination with the corner formed at the transition from the slot width to the width of the slot entrance.

The invention claimed is:

1. An apparatus for producing a wave-type winding pattern made of a series of fillets and head portions for an electrical element of an electrical machine from coil windings of a group of n wires, wherein two associated fillets of a wire are joined by a respective gable-shaped head portion, said apparatus for producing a wave-type winding pattern comprising:
    a wire guide which pays out n parallel wires in a plane with a predetermined intermediate distance between adjacent wires;
    a flat former having opposite first and second long flat sides which alternatively take up the n parallel wires from the wire guide while maintaining the intermediate distances of the n wires, said flat former being operative to undergo repeated 180° winding rotations about a pivot axis whereby n fillets of the n parallel wires are wound flat against the respective first and then second flat sides of the flat former;
    first and second shaping bodies which are oppositely spaced a same radial distance from both the first and second sides of the former, the first and second shaping bodies being operative to undergo
        a) a stepwise 180° rotation with the 180° winding rotation of the flat former so that the n parallel wires paying out from the wire guide are alternately rotated with the first and second shaping bodies to form n fillets on the respective first and second flat sides of the former and to form respective n head portions extending laterally away from the n fillets on the flat former, and
        b) a removal from adjacent the n head portions formed by the 180° rotation, to reduce tension on the just-formed n head portions;
    means for holding n ends of each respective previously-formed fillets; and
    first and second guide devices which displace the n just-formed fillets relative to the former such that legs of each n head portions are spread apart and gable shaped head portions are formed.

2. The apparatus for producing a wave-type winding pattern as claimed in claim 1, further comprising a striplike or rail-like coil holder with unilaterally disposed transverse slots and being operative for receiving and transferring the fillets of the winding stripped from the former into radially outward open slots of a rotor or rotorlike transfer tool for further transfer into radially inward open slots of a stator or rotor lamination pocket.

3. The apparatus according to claim 2,
    wherein the first and second shaping bodies are respective first and second bolts; and
    further including a disk that is rotatable with the former on which the first and second bolts are mounted for being operative to each move
        a) axially outward from the disk and located at a radial spacing from the short sides of the former that is dimensioned in accordance with the wire length of a head portion, and into an operative position parallel to the pivot axis of the former, and
        b) retracted inward into the disk before the forming of the gable shaped head portions take place.

4. The apparatus according to claim 3, wherein the first and second guide devices are each formed by a pair of guide shoes on each of the first and second long flat faces of the former, and both guide shoes of each pair can be pressed side by side, in the manner of an intermittent conveyor, against the fillets, made on the former, of the coil windings and against the former.

5. The apparatus according to claim 4, wherein for each pair of guide shoes, an inner guide shoe is located in the middle region of the fillets, and an outer guide shoe is located in the two outer end regions of the fillets.

6. The apparatus according to claim 4, wherein the wire guide is moved during one work cycle unilaterally, relative to the former, approximately in a semicircle about the former, in which motion the wire guide accompanies one of the shaping bodies at a time.

7. The apparatus according to claim 6, wherein the former upon each spreading of the n head portions is axially advanced to the extent of the spreading motion and in the same direction.

8. The apparatus according to claim 1,
    wherein the first and second shaping bodies are respective first and second bolts; and
    further including a disk that is rotatable with the former on which the first and second bolts are mounted for being operative to each move
        a) axially outward from the disk and located at a radial spacing from the short sides of the former that is dimensioned in accordance with the wire length of a head portion, and into an operative position parallel to the pivot axis of the former, and
        b) retracted inward into the disk before the forming of the gable shaped head portions take place.

9. The apparatus according to claim 1, wherein the first and second guide devices are each formed by a pair of guide shoes on each of the first and second long flat faces of the former, and both guide shoes of each pair can be pressed side by side, in the manner of an intermittent conveyor, against the fillets, made on the former, of the coil windings and against the former.

10. The apparatus according to claim 9, wherein for each pair of guide shoes, an inner guide shoe is located in the middle region of the fillets, and an outer guide shoe is located in the two outer end regions of the fillets.

11. The apparatus according to claim 1, wherein the wire guide is moved during one work cycle unilaterally, relative to the former, approximately in a semicircle about the former, in which motion the wire guide accompanies one of the shaping bodies at a time.

12. The apparatus according to claim 1, wherein the former upon each spreading of the n head portions is axially advanced to the extent of the spreading motion and in the same direction.

* * * * *